United States Patent
Lu et al.

(10) Patent No.: US 7,509,565 B2
(45) Date of Patent: *Mar. 24, 2009

(54) WIRELESS ACCESS MODEM HAVING DOWNSTREAM CHANNEL RESYNCHRONIZATION METHOD

(75) Inventors: Xiaolin Lu, Plano, TX (US); Srinath Hosur, Plano, TX (US); Manish Goel, Plano, TX (US); Michael O Polley, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 179 days.

This patent is subject to a terminal disclaimer.

(21) Appl. No.: 11/470,916

(22) Filed: Sep. 7, 2006

(65) Prior Publication Data

US 2007/0089042 A1    Apr. 19, 2007

Related U.S. Application Data

(62) Division of application No. 10/643,119, filed on Aug. 18, 2003, now Pat. No. 7,120,854.

(51) Int. Cl.
*H03M 13/00* (2006.01)
*H04L 5/16* (2006.01)

(52) U.S. Cl. .................................. 714/784; 714/789
(58) Field of Classification Search ................ 714/784, 714/775, 789
See application file for complete search history.

*Primary Examiner*—Shelly A Chase
(74) *Attorney, Agent, or Firm*—Steven A. Shaw; W. James Brady; Frederick J. Telecky, Jr.

(57) ABSTRACT

A resynchronization method for use in a data communication system having a first device configured to transmit data at a symbol rate to a second device. The second device includes a Reed Solomon (RS) decoder having a RS lock indicator and a Moving Picture Experts Group (MPEG) Protocol Interface (MPI) having a MPI lock indicator, wherein the RS and MPI lock indicators are monitored. Four different states, defined by the values of the RS and MPI lock indicators, determine whether the data communication system will wait for the RS decoded and the MPI hardware block to resynchronize, whether an intermediate-subset of the channel acquisition algorithm is performed or whether the entire channel acquisition algorithm is performed. The method of resynchronization described herein recovers synchronization within a predetermined time without the layers above the physical link layer having knowledge.

7 Claims, 4 Drawing Sheets

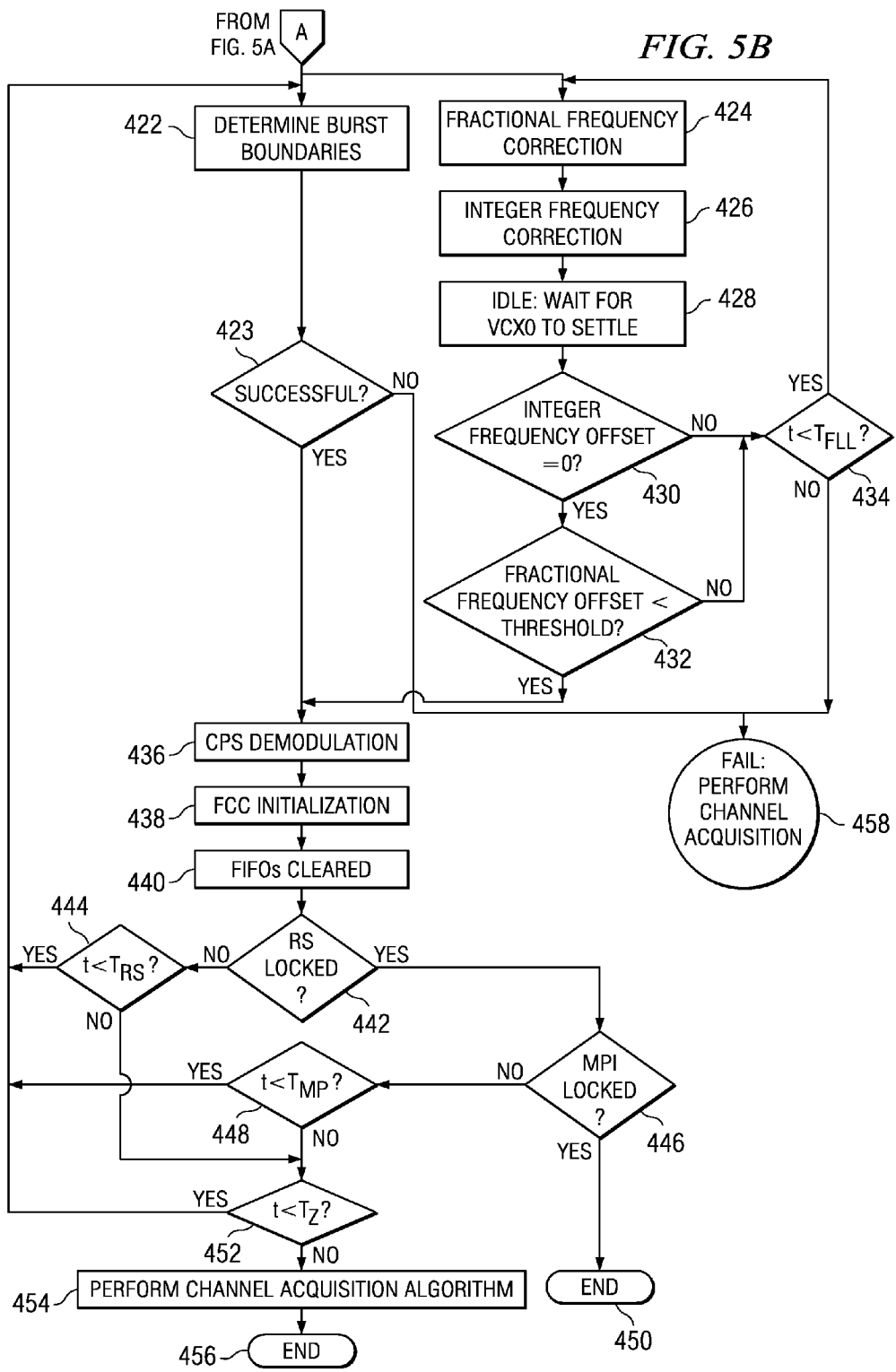

WIRELESS ACCESS MODEM HAVING DOWNSTREAM CHANNEL RESYNCHRONIZATION METHOD

CROSS-REFERENCE TO RELATED APPLICATIONS

This application is a Divisional of and claims priority under 35 U.S.C. S 120 to U.S. Ser. No. 10/643,119, filed on Aug. 18, 2003, entitled WIRELESS ACCESS MODEM HAVING DOWNSTREAM CHANNEL RESYNCHRONIZATION METHOD. Said application now U.S. Pat. No. 7,120,854 issued on Oct. 10, 2006 and incorporated herein by reference.

FIELD OF THE INVENTION

The present invention relates to wireless access modem systems, and, more particularly, to a downstream channel resynchronization method and apparatus for a wireless access modem system.

BACKGROUND OF THE INVENTION

In data communication systems where mobility is required, peripheral devices, such as, broadband modems, may be used which allow wireless communication between an information handling system and a remote device. Specifically, a wireless modem incorporated in the customer premium environment (CPE) couples wirelessly to a wireless access termination system or wireless base station through at least one antenna. The clock or timing within the wireless access modem must be the same as that in the wireless access termination system prior data transmission. Thus, synchronization is performed when the system is powered up.

Wireless modems may be designed for asynchronous or synchronous data transmission. Asynchronous transmission is also referred to as start-stop or bursty transmission, and is usually employed by unbuffered terminals where the time between character transmission occurs randomly. Thereby, the data that flows from a wireless access modem to an information handling system or wireless access termination system will be a bursty, asynchronous data transfer. This data transfer indicates an upstream flow of data. Conversely, data flowing from the wireless access termination system to the wireless access modem indicates a downstream flow of data. This data transmission is a synchronous continuous stream of data. Accordingly, downstream traffic flows at a constant rate and requires synchronization.

Synchronous transmission between modems or other communications devices provides a continuous bit stream of information. No start and stop bits are required to delimit individual characters as in asynchronous transmission. The digital data may be arranged in data symbols and encoded using any number of the various known techniques. Groups of data symbols are formed into encoded data blocks with the length of the block varying from a few characters to a thousand or more. The receiving modem or communication device decodes the data symbols to obtain the original digital data. Each modem or communication device provides a timing signal or clock that is used to establish the data transmission rate and to enable the devices attached to the modems to identify the appropriate bits in each character as they are being transmitted or received as is disclosed in U.S. Pat. No. 6,332,009, which is incorporated by reference herein. Thus, encoded information bits in data symbols are arranged such that they concurrently convey synchronization or timing information to the modem receiving the signal. Synchronization conveying data symbols may be transmitted during an initialization or synchronization procedure or periodically during a resynchronization period performed during a given data transmission session. In some instances, timing may be provided by the terminal device itself or a communication component, such as a multiplexer or front-end processor channel. Regardless of the timing source, the transmitting and receiving devices must establish synchronization among themselves prior to commencing the transmission of data.

A wireless access modem is generally comprised of four components: a transmitter, a receiver, a modem control block and a power supply. The receiver section is responsible for maintaining synchronization using a channel acquisition algorithm after a coupled transmitter has sent a synchronization signal. Generally, the receiver includes an equalizer, a timing recovery module, a demodulator, a descrambler and a DTE interface. In some wireless modem designs, a Reed Solomon decoder couples to receive the descrambled signal to provide error correction in the signal according to known principles. In addition, this module provides Forward Error Correction (FEC) validity or lock indication to an associated controller unit located within the modem. Reed-Solomon error correction is a known type of FEC. The FEC lock indication signals that the Reed-Solomon error correction is synchronized to the data being corrected and is providing valid output.

Moreover, the Reed Solomon decoder may include a Moving Picture Experts Group (MPEG) Protocol Interface (MPI) which represents the last module within the physical layer of the data protocol. The MPI generates 144 bytes per frame for broadcasting the data and a synchronization (sync) byte is used to detect if the frame is synchronized. A media access control (MAC), the second lower layer in the data protocol, couples to receive each frame from the MPI to control when media may be accessed. The host interface couples between the MAC and a personal computer or peripheral device.

Typically, synchronization is lost as a result of signal fading. Signal fading occurs when there is interruption in the signal which leads to a disconnect of the synchronization. Conventionally, the loss of a synchronization may be detected in either one of two ways. First, while monitoring the signal power, a loss of synchronization occurs when the synchronization track of an automatic gain control (AGC) has failed as shown in U.S. Pat. No. 6,332,009. Second, by monitoring when either the Reed Solomon decoder or MPI has lost synchronization. If the sync byte is not detected while monitoring the MPEG Protocol Interface (MPI) sync byte or the Reed/ Solomon decoder is not synchronized, the system assumes that the synchronization is lost. Accordingly, the channel acquisition algorithm is restarted or a system reboot is begun; either of which is communicated to the MAC. Thereby, the user of the computer system is alerted and service is interrupted. This interruption in service is an annoyance to the user. Moreover, this approach is lengthy; and, as a result, negatively affects time, cost, and performance.

Therefore, a need exists for a method and apparatus for resynchronization that may recover the synchronization within a predetermined unit of time without the layers above the physical link layer having knowledge.

SUMMARY OF THE INVENTION

To address the above-discussed deficiencies of resynchronization schemes within data communication systems, the present invention teaches a resynchronization method for use in a data communication system having a first device configured to transmit data at a symbol rate to a second device. The second device includes a Reed Solomon (RS) decoder having a RS lock indicator and a Moving Picture Experts Group (MPEG) Protocol Interface (MPI) having a MPI lock indicator. The RS and the MPI lock indicators are monitored.

In a first state, where both the RS and the MPI lock indicators are locked, the resynchronization process is ended for this first state indicates that the data communication system is synchronized.

In a second state, where the RS lock indicator is unlocked and the MPI lock indicator is locked, a channel acquisition algorithm associated with the data communication system is performed and the resynchronization process is ended.

In a third state, where the RS lock indicator is locked and the MPI unlock indicator is locked, the RS and MPI lock indicators are monitored for a first predetermined time interval, waiting for synchronization to occur in the RS decoder and the MPI hardware block. While in the third state, if the MPI indicator switches to locked and the monitoring time is less than or equal to the first predetermined time interval, the resynchronization process is ended. This is an indication that the data communication system is synchronized. While in the third state, if the RS lock indicator switches to unlocked and the monitoring time is less than or equal to the first predetermined time, then an intermediate-subset of the channel acquisition algorithm is performed and the resynchronization process is ended. If, however, while in the third state, the monitoring time is greater than the first predetermined time interval and synchronization has not yet been achieved, then the channel acquisition algorithm is performed.

In a fourth state, where both the RS and MPI lock indicators are unlocked, the intermediate-subset of the channel acquisition algorithm is performed and the RS and MPI lock indicators are monitored for a second predetermined time interval waiting for synchronization to occur in the RS decoder and the MPI hardware block. If both the RS and MPI lock indicators switch to locked within the second predetermined time interval, then the resynchronization process ends. Otherwise, the channel acquisition algorithm is performed, if resynchronization fails.

An intermediate-subset of the channel acquisition algorithm or a PHY resynchronization algorithm may include the following steps. In a first step, the burst boundaries are determined. In a next step, a fractional frequency correction is applied until the fractional frequency offset is below a first threshold. Integer frequency correction is applied until the integer frequency offset is zero in another step. In a following step, the system waits for a voltage-controlled crystal oscillator (VCXO) within the data communication system to settle. Cyclic Prefix Sequence (CPS) demodulation is performed to obtain a proper sequence of training tone phase sets in another step. In a following step, Forward Error Correction (FEC) initialization is performed. A plurality of First-In First-Out registers associated with the data communication system are cleared in a next step. In another step, it is detected whether the RS and MPI lock indicators are locked. If both the RS lock indicator and the MPI lock indicator are not locked, the system repeats the resynchronization algorithm from the first step if a third predetermined time has not expired. Finally, If both the RS lock indicator and the MPI lock indicator are not locked within a third predetermined time, the channel acquisition algorithm is performed which signifies that the resynchronization algorithm has failed to secure both a locked RS lock indicator and a locked MPI lock indicator.

These and other features and advantages of the present invention will be understood upon consideration of the following detailed description of the invention and the accompanying drawings.

BRIEF DESCRIPTION OF THE DRAWINGS

For a more complete understanding of the present invention and the advantages thereof, reference is now made to the following description taken in conjunction with the accompanying drawings in which like reference numbers indicate like features and wherein.

DETAILED DESCRIPTION OF PREFERRED EMBODIMENT

Figure 1:
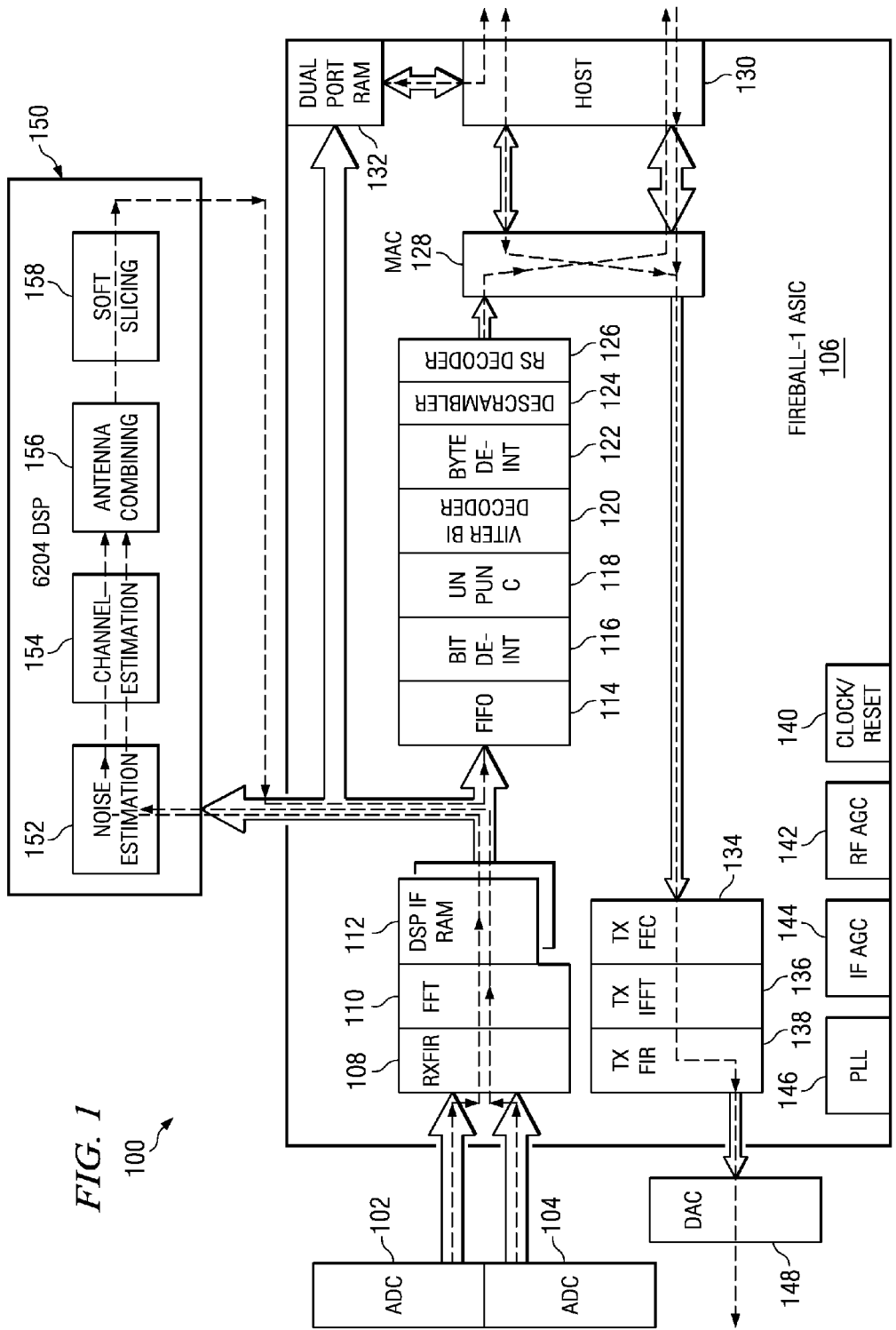
FIG. 1 illustrates modem in accordance with to the present invention.

The present invention will now be described more fully hereinafter with reference to the accompanying drawings, in which embodiments of the invention are shown. This invention may, however, be embodied in many different forms and should not be construed as limited to the embodiments set for the herein. Rather, these embodiments are provided so that this disclosure will be thorough and complete, and will fully convey the scope of the invention to those skilled in the art As shown in FIG. 1, a wireless access modem in accordance with the present invention includes at least one antenna connected to an analog-to-digital converter (ADC) 102, 104, an Application Specific Integrated Circuit (ASIC) 106, a digital signal processor (DSP) 150, and a digital-to-analog converter (DAC) 148. Within an Application Specific Integrated Circuit (ASIC) 106, a finite impulse response (FIR) filter 108 couples to receive the converted digital signal and filters the digital signal. A Fourier transform filter (FFT) 110 further filters the filtered digital signal. An Interface (IF) memory storage unit 112 couples to receive the Fourier transformed signal. Next, noise estimation and channel estimation are performed in the DSP using noise estimation unit 152 and channel estimation unit 154, respectively. In addition, the signals from all receive antennas are combined in antenna combining module 156 and soft slicing occurs within soft slicing unit 158. Returning to the ASIC 106, a First In/First Out (FIFO) storage 114 couples to receive the signal. Bit deinterleaving and unpuncturing of the data is conducted in the bid deinterleaver 116 and unpuncturing unit 118, respectively. A Viterbi decoder 120 decodes the data signal samples. Byte deinterleaving occurs after the information is decoded in byte deinterleaver 122. A descrambler 124 descrambles the data. Data is Reed-Solomon error corrected according to known principles in a Reed-Solomon module 126. In addition, this module may provide Forward Error Correction (FEC) validity or lock indication to a controller unit (not shown). Reed-Solomon error correction is a known type of Forward Error Correction. The FEC lock indication signals that the Reed-Solomon error correction is synchronized to the data being corrected and is providing a valid output. A Moving Picture Experts Group (MPEG) Protocol Interface (MPI) (not shown) couples within the Reed/Solomon decoder 126 to generate 144 bytes per frame for broadcasting the data. An sync byte is used to lock and synchronize to the MPEG frame. This provides an MPI lock variable wherein the controller can make a determination whether the MPI is locked.

The resynchronization process in accordance with the present invention takes advantage of the fact that the RS and MPI lock indicators are set prior to the medium access control (MAC) layer 128 such that a method and apparatus for resynchronization which recovers synchronization within a predetermined unit of time without the layers above the physical link layer having knowledge. The MAC layer 128 communicates with the host 130 and the transmitter portion of ASIC 106. The transmitter portion includes Forward Error Correction unit 134 connected to Inverse Fast Fourier Transformer (IFFT) unit 136 which connects to a FIR filter 138. FIR filter 138 connects to digital-to-analog converter (DAC) 148. ASIC 106 additionally includes a Phase Lock Loop (PLL) 146, and Interface Automatic Gain Controller (IF AGC) 144, Radio Frequency Automatic Gain Controller (RF AGC) 142, 15 and ClockReset unit 140.

Figure 2:
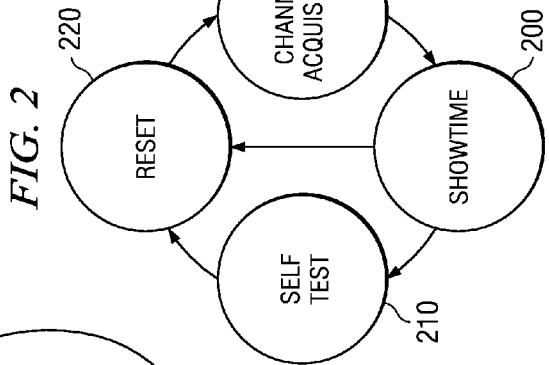
FIG. 2 shows a known simplified modem state machine.

FIG. 2 illustrates a known modem state machine simplified. When both the RS and MPI lock indicators are locked, seamless transmission of data occurs and is indicated by "Showtime". The modem periodically performs a self test to determine whether synchronization still exists. If the synchronization is lost, the modem will automatically reset to resynchronize with the transmitter using a channel acquisition algorithm compliant with the system. In the alternative, the reset procedure can occur without using the self test procedure.

Encoded information bits in data symbols are arranged such that they concurrently convey synchronization or timing information to the modem receiving the signal. Synchronization conveying data symbols may be transmitted during an initialization or synchronization procedure or periodically during a resynchronization period performed during a given data transmission session. It should be appreciated that the techniques described herein may be equivalently applied to a system that utilizes a synchronization signal that is transmitted independent from the data symbols.

As stipulated previously, the loss of synchronization may be detected in either one of two ways. First, while monitoring the signal power, a loss of synchronization occurs when the synchronization track of an automatic gain control (AGC) has failed as shown in U.S. Pat. No. 6,332,009. Second, by monitoring when the MPI lost synchronization bit is set, the loss of synchronization is detected.

Figure 3:
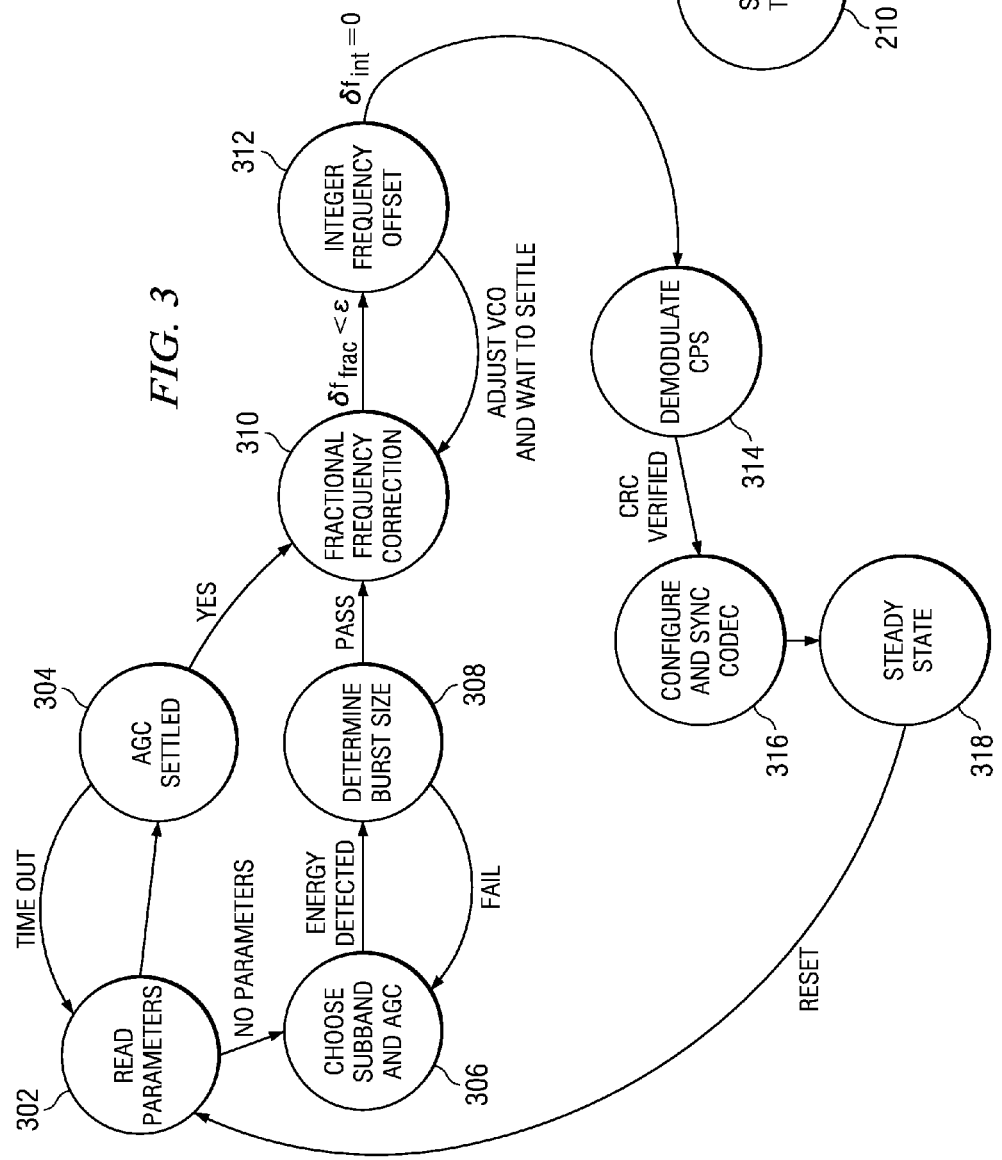
FIG. 3 displays a known Synchronization state diagram.

FIG. 3 illustrates a known synchronization state diagram. Initially, in step 302, the DSP 150 reads the frequency table provided by the host 130 to check the last used set of parameters. If these parameters are available, the DSP tries to AGC lock by reading the AGC lock indicator 142 and the settings on the AGC attenuators 142, 144. The DSP 150 determines if sufficient signal strength exists on the channel. If this is sufficient, the DSP 150 goes through fractional frequency correction in step 310 and other steps 312-318 of the synchronization algorithm as shown. When there is no sufficient signal strength, the DSP 150 searches for another channel in its channel map. This process is continued until all channels are exhausted at which time the DSP 150 searches for new channels. The DSP 150 monitors the AGC lock indicator 142 and the settings on the AGC attenuator 144 to determine the strength of the new channel. Afterwards, the DSP 150 can proceed in two ways: (1) setting the. FIR filter 108 and the VCO to locate other channels and determine the strongest channel and, thereby, proceed with the other steps of synchronization or (2) starting synchronization on the first available channel, with sufficient strength. In this step 308 of synchronization, the burst length and the sub-channel are determined. The DSP 150 obtains the best parameters (N,v) for each sub-channel and determines a a metric both the antennas. If the a metric exceeds a threshold, then the sub-channel is invalid and the DSP 150 searches for a new sub-channel. In step 308, the time tracking loop is started to track the burst boundaries. The fractional frequency offset is corrected in step 310. When the fractional frequency offset is less than a predetermined value, integer frequency offset estimation is conducted in step 312. While the time tracking loop is running, the fractional frequency correction loop is begun. Once the integer frequency offset is determined, the VCO is adjusted and some time is allowed for the VCO to settle. At this point, both the time tracking and the fractional frequency tracking loops are disabled. After the VCO settles and the tracking loops are less than a predetermined threshold, the integer frequency is estimated again. If the integer frequency offset is zero, CPS demodulation is conducted in step 314. In addition, the proper received sequence of the training tone phase sets is determined and the CPS data is demodulated and the CRC is verified. It should be noted that the tracking loops are running at this point. If the CRC fails, step 302 is began again where acquisition of a different sub-band/channel is secured. If the CRC is verified, the demodulator and the Codec parameters are set. In addition, channel estimation, beam-forming, demodulation are begun until a reset is received or the DSP is commanded to search for a new channel or up-link access is denied.

Figure 4:
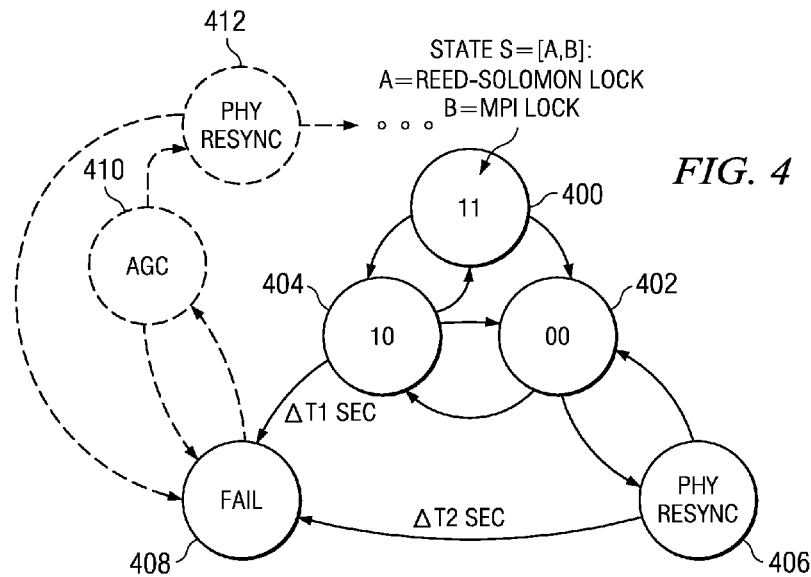
FIG. 4 illustrates a resynchronization MPI/Reed Solomon state machine in accordance with to the present invention.
Figure 5A:
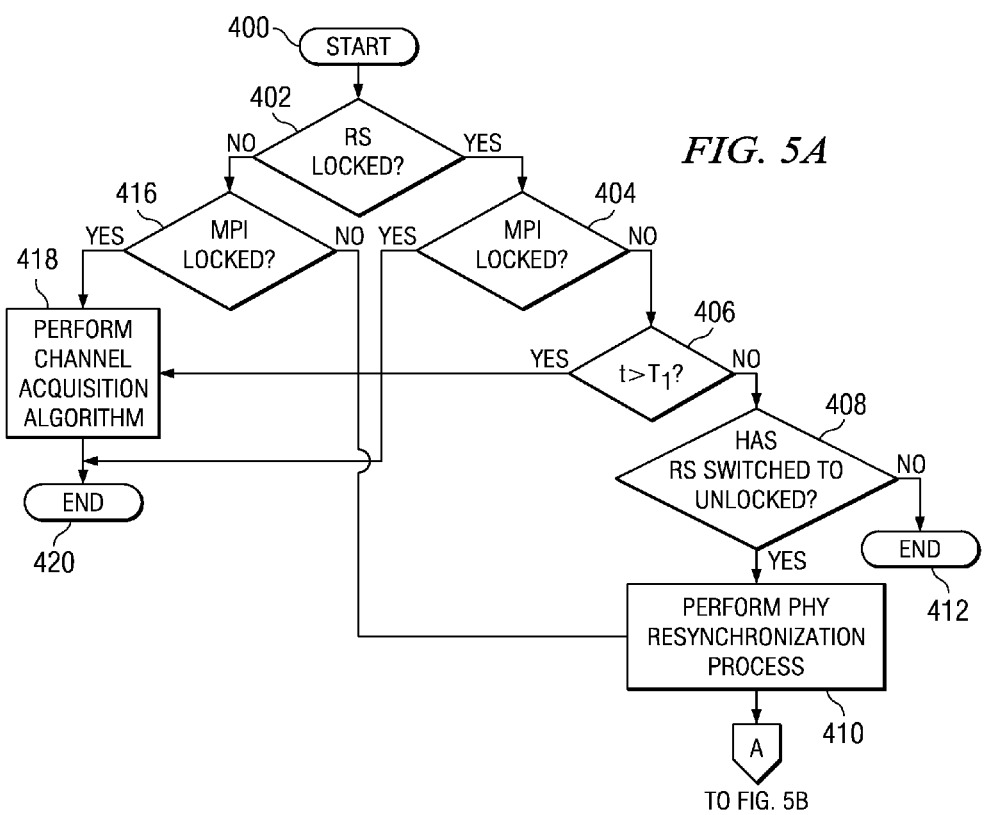
FIG. 5 shows a flow chart of the resynchronization process in accordance with the present invention.

FIG. 4 displays the resynchronization MPI/RS state machine in accordance with the present invention. When a sync loss is detected in the downstream synchronization state machine, the sync machine will go to an "idle" state for a short predetermined period of time first to make sure that the ASIC 106 will regain RS lock and MPI lock automatically. If the sync lost duration is short, resynchronization may occur automatically inside the ASIC 106.

Defining the state variables respective of the RS lock indicator and the MPI lock indicator, each state s denotes the RS and MPI lock indicators (RS lock, MPI lock), respectively. Thus, there are four respective states as shown, "11", "01", "10", and "00" where "1" indicates locked and a "0" indicates unlocked. While within the "idle" state, state variables are defined.

When both the RS and MPI lock indicators are locked, the first state is a "11" which indicates normal behavior for operation where the data communication system is synchronized. Based upon the functionality of ASIC 106, the system is never expected to be in the second state "01" for a long time. This state implies that RS lock is unlocked while the MPI lock is locked. Since this is catastrophic for the system, it is best to reset the modem without trying to regain resynchronization. In the third and fourth respective states, "10" or "00", the resynchronization state machine indicates that the PHY resynchronization procedure is initiated; where the PHY resynchronization procedure is an intermediate-subset of the channel acquisition algorithm.

For the third state "10", there are three possible scenarios. If DSP firmware 150 is feeding symbols into FIFO 114, the present state s of the modem should not stay in the third state "10" for more than a first predetermined time delay constraint of $T_1$ seconds imposed by the transmitter's interleaver and FEC blocks. Therefore, if the present state s is in the third state "10" for more than $T_1$ seconds, a channel acquisition algorithm will be initiated to regain synchronization. Two other possible scenarios exist where the present state s may jump to a different state, such as the first state, "11", or the fourth state, "00", in less than $T_1$ seconds. If the present state s jumps to the first state, "11", the resynchronization process should end since this represents the normal behavior of operation for the modem. In the alternative, if the present state s jumps to the fourth state "00", the PHY resynchronization process in accordance with the present invention is initialized.

If the present state s is in the fourth state "00", the PHY resynchronization algorithm is run for a second predetermined delay time $T_2$ seconds. The second predetermined delay time 12 is determined by the duration of a deep fade coupled with the delay of PHY resynchronization algorithm. If resynchronization occurs where the present state s is the first state "11", no further action is required for normal operation proceeds. Otherwise, if resynchronization does not occur within 12 seconds, the state machine displays that the modem will progress to the Fail state.

In the Fail state, the present state of the modem proceeds to Channel Acquisition where the Channel Acquisition Algorithm will be run. Sub-channel scanning is initiated where the process moves from one sub-channel to the next. If all sub-channels and RF channels are exhausted, in an "End of the Working" state (not shown) the host will reset the modem.

The PHY resynchronization process, which is the intermediate-subset of the channel acquisition algorithm, in accordance with the present invention includes the following steps as shown in FIG. 4. In step 402, it is detected whether the RS lock indicator is locked. If the RS lock indicator is locked then, it is detected whether the MPI lock indicator is locked in step 404. If the MPI lock indicator is not locked, then it is detected whether the time in the state is less than a first predetermined time delay in step 406. If it is less than the first predetermined time delay, in step 418 the channel acquisition algorithm is performed. If the time within the state is equal to or greater than the first predetermined time delay, in step 408, it is detected whether the RS lock indicator has switched to unlocked. If the RS lock indicator has switched to unlocked, then the resynchronization algorithm is begun in step 410. If the RS lock indicator has remained locked, then the resynchronization procedure ends in step 412. If during the detection of the RS lock indicator in step 402 the RS lock indicator is not locked, than it is detected whether the MPI lock indicator is locked in step 416. If the. MPI lock indicator is locked, the channel acquisition algorithm is performed in step 418 and the resynchronization process ends in step 420. If the MPI lock indicator is unlocked, then the resynchronization algorithm is begun in step 410.

The PHY resynchronization process begins with determining the burst boundaries in step 422. The burst boundaries are re-determined using a burst size process. Burst size procedure has been designed to synchronize up to 7 to 10 dB below the Additive White Gaussian Noise (AWGN) sensitivity such that the burst size should rarely fail this stage during resynchronization. In case of failure, however, step 423 provides that the modem will go into the Fail state 458 associated with the Fail state 308 of FIG. 3. Frequency correction/acquisition is conducted in steps 424, 426 and 428. Unlike in the initial acquisition stage, the frequency locked loop (FLL) internal variables need not be reset. While tracking burst boundaries in step 422, repeatedly steps 424, 426, and 428 are performed until the integer frequency offset is zero (step 430) and the fractional frequency offset is below a predetermined threshold (step 432). Steps 424, 426, and 428 are repeated for a frequency locked loop time TFLL as indicated by step 434. If unsuccessful, the modem will go into the Fail state 458. Specifically, fractional frequency correction is performed in step 424. Integer frequency correction is performed in step 426. In step 428, the modem waits idle until a voltage-controlled crystal oscillator (VCXO) within the data communication system settles.

The next step 436 includes cyclic prefix sequence (CPS) demodulation to 30 obtain the ABA sequence and not the coding parameters. In step 438, the initialization of the FEC is conducted and the FIFOs are cleared in step 440 with the purpose of locking the RS lock indicator. If there is no RS lock as monitored in step 442, step 444 determines whether the time to gain the RS lock is within a predetermined time TRS. If the predetermined time TRS, step 422 is began again. If not, step 452 determines whether the time is less than a second predetermined time $T_2$ for resynchronization. In respective steps 446 and 448, the MPI lock bit is monitored and the time is determined whether it is within a predetermined time TMPI. If a MPI lock is not achieved while the time is less than predetermined time TMPI, then the step 422 is began again. If a MPI lock is not achieved within the predetermined time IMP, step 452 determines whether the time is less than a second predetermined time $T_2$ for resynchronization. All the steps are repeated until resynchronization is achieved or until a second predetermined time $T_2$ as indicated in step 452. Otherwise, channel acquisition will be performed as shown in step 454. In the alternative, channel acquisition occurs when the synchronization track within the AGC for power monitoring of the signal finds a receive power under certain thresholds for a period of time that is longer than the predetermined resynchronization time $T_2$ or when the resynchronization efforts fail.

Those of skill in the art will recognize that the physical location of the elements illustrated in FIG. 1 can be moved or relocated while retaining the function described above.

Advantages of this design include but are not limited to a method. And apparatus for resynchronization that may recover the synchronization within a predetermined unit of time without the layers above the physical link layer having knowledge but also to a cost efficient, high performance modem.

The reader's attention is directed to all papers and documents which are filed concurrently with this specification and which are open to public inspection with this specification, and the contents of all such papers and documents are incorporated herein by reference.

All the features disclosed in this specification (including any accompany claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

The invention claimed is:

1. A resynchronization process for use in a data communication system having a first device configured to transmit data at a symbol rate to a second device, the second device including a Reed Solomon (RS) decoder having a RS lock indicator and a Moving Picture Experts Group (MPEG) Protocol Interface (MPI) having a MPI lock indicator, the method comprising:

detecting whether the RS lock indicator is locked;
  detecting whether the MPI lock indicator is locked; and
  ending the resynchronization process, when in a first state where the RS lock indicator is locked and the MPI indicator is locked, indicating that resynchronization exists.

2. The synchronization process as recited in claim 1, further comprising:

performing a channel acquisition algorithm in accordance with the data communication system, when the system is in a second state where the RS lock indicator is unlocked and the MPI indicator is locked;

monitoring the RS lock indicator and the MPI lock indicator during a first predetermined time interval when the system is in the third state where the RS lock indicator is unlocked and the MPI indicator is locked, waiting for resynchronization to occur in the RS decoder and the MPI hardware block; and ending the resynchronization process in the third state when the MPI indicator switches to locked and the monitoring time is less than or equal to the first predetermined time interval, indicating that resynchronization exists.

3. The resynchronization process as recited in claim 2, further comprising:

performing an intermediate-subset of the channel acquisition algorithm;

ending the resynchronization process in the third state when the RS lock indicator switches to unlocked and the monitoring time is less than or equal to the first predetermined time interval; and performing a channel acquisition algorithm, when in the third state, the monitoring time is greater than the first predetermined time interval and resynchronization does not exist.

4. The resynchronization process as recited in claim 2, further comprising:

performing the intermediate-subset of the channel acquisition algorithm during a second predetermined time interval when the system is in the fourth state where the RS lock indicator is unlocked and the MPI indicator is unlocked;

monitoring the RS lock indicator and the MPI lock indicator;

awaiting resynchronization to occur in the RS decoder and the MPI hardware block;

ending the resynchronization process in the fourth state, when both the RS lock indicator and the MPI indicator switch to locked, indicating synchronization exists; and performing the channel acquisition algorithm, when in the fourth state, the monitoring time is greater than the second predetermined time interval and resynchronization does not exist.

5. The programmable processing module as recited in claim 1, further comprising stored instructions operable to cause the programmable processor to:

perform a channel acquisition algorithm in accordance with the data communication system, when the system is in a second state where the RS lock indicator is unlocked and the MPI indicator is locked;

monitor the RS lock indicator and the MPI lock indicator during a first predetermined time interval when the system is in the third state where the RS lock indicator is unlocked and the MPI indicator is locked, waiting for resynchronization to occur in the RS decoder and the MPI hardware block; and end the resynchronization process in the third state when the MPI indicator switches to locked and the monitoring time is less than or equal to the first predetermined time interval, indicating that synchronization exists.

6. The programmable processing module as recited in claim 5, further comprising stored instructions operable to cause the programmable processor to:

perform an intermediate-subset of the channel acquisition algorithm;

end the resynchronization process in the third state when the RS lock indicator switches to unlocked and the monitoring time is less than or equal to the first predetermined time interval; and perform a channel acquisition algorithm, when in the third state, the monitoring time is greater than the first predetermined time interval and resynchronization does not exist.

7. The programmable processing module as recited in claim 6, further comprising stored instructions operable to cause the programmable processor to:

perform the intermediate-subset of the channel acquisition algorithm during a second predetermined time interval when the system is in the fourth state where the RS lock indicator is unlocked and the MPI indicator is unlocked;

monitor the RS lock indicator and the MPI lock indicator;

await resynchronization to occur in the RS decoder and the MPI hardware block;

end the synchronization process in the fourth state, when both the RS lock indicator and the MPI indicator switch to locked, indicating resynchronization exists; and perform the channel acquisition algorithm, when in the fourth state, the monitoring time is greater than the second predetermined time interval and resynchronization does not exist.

* * * * *